US009621429B2

(12) United States Patent
Nuss et al.

(10) Patent No.: US 9,621,429 B2
(45) Date of Patent: Apr. 11, 2017

(54) SYSTEM, METHOD, AND APPARATUS FOR INCORPORATING A CENTRALIZED SELF ORGANIZING NETWORK (SON) IN A NETWORK

(71) Applicant: CISCO TECHNOLOGY, INC., San Jose, CA (US)

(72) Inventors: Ziv Nuss, Tsur Yigal (IL); Horia Miclea, Epalinges (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 200 days.

(21) Appl. No.: 14/310,936

(22) Filed: Jun. 20, 2014

(65) Prior Publication Data

US 2015/0372874 A1    Dec. 24, 2015

(51) Int. Cl.
H04L 12/24 (2006.01)
H04W 36/00 (2009.01)
H04W 24/02 (2009.01)
H04W 84/18 (2009.01)

(52) U.S. Cl.
CPC ......... H04L 41/12 (2013.01); H04W 36/0061 (2013.01); H04W 24/02 (2013.01); H04W 84/18 (2013.01)

(58) Field of Classification Search
None
See application file for complete search history.

(56) References Cited

U.S. PATENT DOCUMENTS

| 7,447,167 | B2 | 11/2008 | Nadeau et al. |
| 7,746,793 | B2 | 6/2010 | Nadeau et al. |
| 7,929,970 | B1* | 4/2011 | Gunasekara ......... H04W 36/04 455/437 |
| 7,940,777 | B2 | 5/2011 | Asati et al. |
| 8,098,663 | B2 | 1/2012 | Guichard et al. |
| 8,189,585 | B2 | 5/2012 | Dharwadkar et al. |
| 8,194,664 | B2 | 6/2012 | Dharwadkar et al. |
| 8,467,411 | B1 | 6/2013 | Minei et al. |
| 9,007,941 | B1 | 4/2015 | Miclea et al. |
| 9,106,530 | B1* | 8/2015 | Wang ..................... H04L 41/12 |

(Continued)

FOREIGN PATENT DOCUMENTS

EP    2958369    12/2015

OTHER PUBLICATIONS

Zhang Xincheng et al., "Chapter 6: Self-Organizing Network," LTE-Advanced Air Interface Technology, Sep. 5, 2012, CRC Press; 30 pgs.*

(Continued)

Primary Examiner — Steve Young
(74) Attorney, Agent, or Firm — Patent Capital Group

(57) ABSTRACT

In one example embodiment, a Self Organizing Network (SON) element is provided to communicate with at least one Long-Term Evolution (LTE) wireless network and at least one transport communication network. The SON element is operative to obtain information that relates to updated Neighbor Lists from a plurality of enodeBs (eNBs) belonging to the at least one LTE wireless network, and to convey information that relates to the updated Neighbor Lists obtained, to at least one managing entity belonging to the transport communication network.

18 Claims, 3 Drawing Sheets

(56) References Cited

U.S. PATENT DOCUMENTS

| | | | | |
|---|---|---|---|---|
| 2008/0247392 | A1* | 10/2008 | White | H04L 45/04 370/392 |
| 2009/0003350 | A1 | 1/2009 | Guichard et al. | |
| 2010/0246581 | A1 | 9/2010 | Henry et al. | |
| 2011/0182189 | A1 | 7/2011 | Martini et al. | |
| 2011/0268044 | A1* | 11/2011 | Yun | H04W 24/00 370/329 |
| 2013/0003740 | A1 | 1/2013 | Zheng | |
| 2013/0215870 | A1 | 8/2013 | Hosobe et al. | |
| 2015/0030024 | A1* | 1/2015 | Venkataswami | H04L 45/74 370/392 |
| 2015/0092552 | A1* | 4/2015 | Bajj | H04W 28/08 370/235 |
| 2015/0109955 | A1* | 4/2015 | Wilkinson | H04L 45/02 370/254 |
| 2015/0312055 | A1* | 10/2015 | Varga | H04L 12/4641 370/254 |

OTHER PUBLICATIONS

Rekhter, Y., et al., "Carrying Label Information in BGP-4," Network Working Group RFC 3107, May 2001.
EPO Nov. 10, 2015 Extended Search Report and Written Opinion from European Application Serial No. 15166457.0; 11 pages.
Aggarwal, et al., "BGP Encodings and Procedures for Multicast in MPLS/BGP IP VPNs," IETF Trust, Network Working Group Internet Draft, Oct. 2009, 61 pages.
ARIN, IPv4 and IPv6, Feb. 10, 2009, p. 1.
Chen, et al., Extended Community Based Outbound Route Filter for BGP-4, IETF Trust, Network Working Group, Internet Draft, Dec. 2011, 6 pages.
Chen, et al., "Outbound Route Filtering Capability for BGP-4," IETF Trust, Network Working Group, RFC5291, Aug. 2008, 12 pages.
Cisco Systems, Inc., "UMMT 3.0 Design Guide Technical Paper," SDU-6432, Version 1.0, Jul. 12, 2012; 104 pages.
Cisco Systems, VPLS and VPWS-At-a-Glance, 2004, 1 page.
Clove Technology, Guide to GSM, GPRS, EDGE, 3G, HSDPA, HSPA (plus) and LTE, Jul. 7, 2007, pp. 1-3.
Freescale Semiconductor, Long Term Evolution Protocol Overview, Oct. 2008, 21 pages.
Han, Rick, Chapter 4 Hierarchy, DHCP, ICMP, Apr. 1, 2002, 26 pages.
Hu, Daniel, LTE Interfaces-S1 and X2 in U-Plane/C-Plane, May 14, 2009, 6 pages.
Interlab, Routing Protocol IS-IS, Sep. 26, 2005, pp. 1-27.
Khan, Shahryar, et al., "The Benefits of Self-Organizing Backhaul Networks," Ericsson Review, Sep. 10, 2013, 9 pages.
Leymann, et al., "Seamless MPLS Architecture," IETF Trust, Internet Engineering Task Force, Internet Draft, Mar. 2011, 47 pages.
Leymann, et al., "Seamless MPLS Architecture," IETF Trust, MPLS Working Group, Internet-Draft, Mar. 2012, 48 pages.
LTE World, Automatic Neighbour Relation, Apr. 20, 2010, 4 pages.
Marques, et al., "Constrained Route Distribution for Border Gateway Protocol/Multiprotocol Label Switching (BGP/MPLS) Internet Protocol (IP) Virtual Private Networks (VPNs)," IETF Trust, Network Working Group, RFC4684, Nov. 2006, 14 pages.
MPLS Label Distribution Protocol, May 1, 2008, 28 pages.
Henderson, P. Michael, Fundamentals of SONET/SDH, Sep. 18, 2001, 58 pages.
Prakash, Ravi, ISPF Version 2, RFC 2328 Feb. 1, 2002, 12 pages.
Troubleshooting Command Difference Between VPNv4 and VPNv6, Mar. 22, 2010, 4 pages.
Zhang Xincheng et al., "Chapter 6: Self-Organizing Network ," LTE-Advanced Air Interface Technology, Sep. 5, 2012, CRC Press; 30 pages.

* cited by examiner

SYSTEM, METHOD, AND APPARATUS FOR INCORPORATING A CENTRALIZED SELF ORGANIZING NETWORK (SON) IN A NETWORK

TECHNICAL FIELD

The present disclosure relates to methods and systems for optimizing operation of cellular networks and more specifically to a method and device that enable coordination of operations carried out by various devices belonging to LTE type cellular networks.

BACKGROUND

In Long-Term Evolution (LTE) networks, evolved UMTS Terrestrial Radio Access (e-UTRA) is the air interface of 3GPP's Long Term Evolution (LTE) upgrade path for mobile networks. It is a radio access network standard that enables transfer of high data rates, lower latency and is optimized for packet data. Wireless data usage has been increasing significantly over the last few years and is expected to further increase due to the increased offering and demand of services and content on-the-move and the continued reduction of costs for the final user. This increase is expected to require not only faster networks and radio interfaces but also high cost-efficiency. Thus, the 3GPP consortium has set the requirements for a radio interface (evolved UMTS Terrestrial Radio Access Network—EU-TRAN) and core network evolution that would fulfill this need.

BRIEF DESCRIPTION OF THE DRAWINGS

For a more complete understanding of the present disclosure, reference is now made to the following detailed description taken in conjunction with the accompanying drawings wherein.

DETAILED DESCRIPTION OF EXAMPLE EMBODIMENTS

Overview

Figure 1:
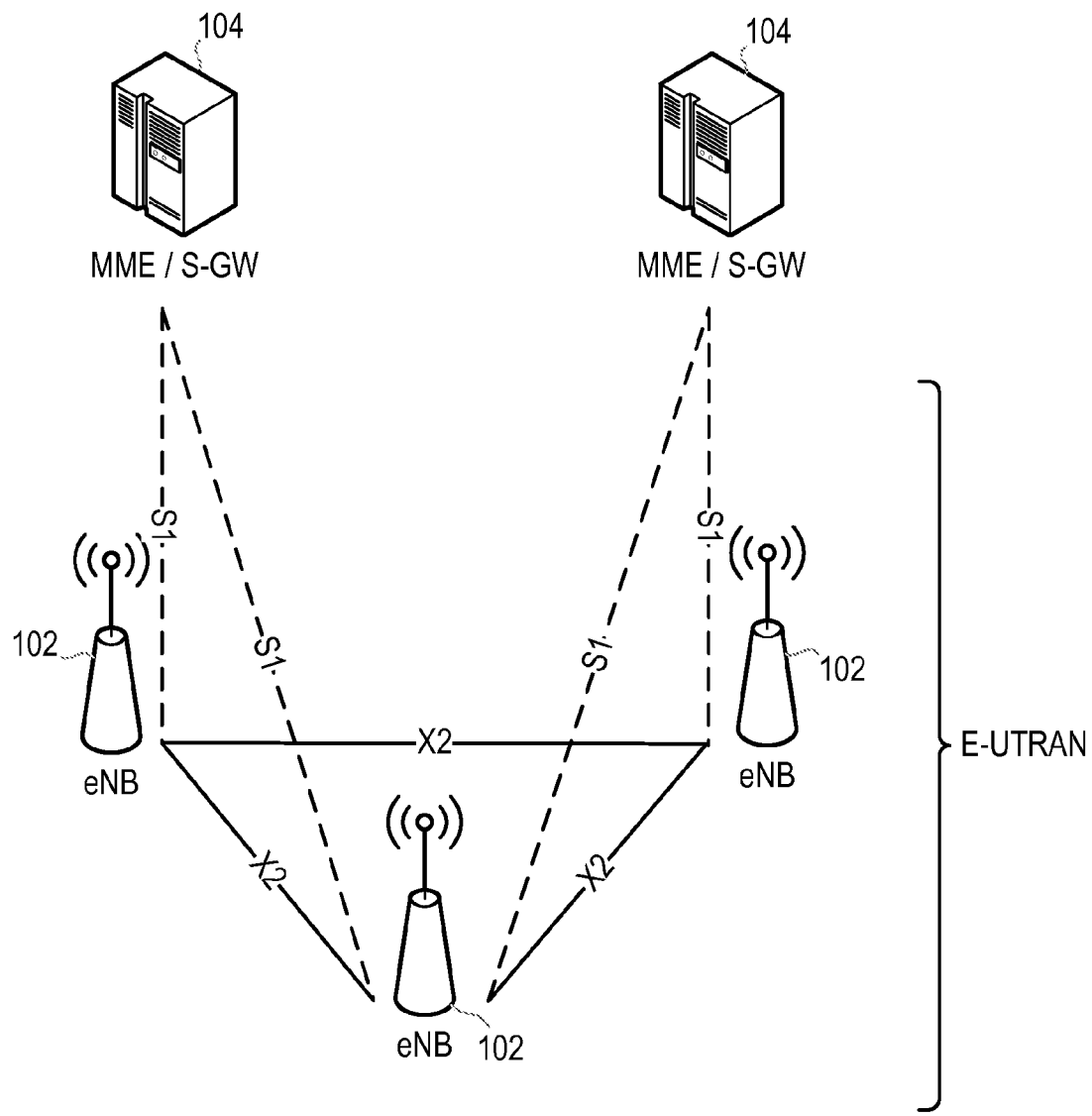
FIG. 1 demonstrates an example architecture of an LTE network.

The disclosure may be summarized by referring to the appended claims. It is an object of the present disclosure to provide a method for integrating a centralized Self-Organizing Network (cSON) apparatus in a Long-Term Evolution (LTE) network to provide a flexible and self organizing transport network for such an LTE network. It is another object of the present disclosure to provide an apparatus and a method for optimizing combined operation of an LTE cellular network and a transport network containing multiple vendors' equipment. Other objects of the disclosure will become apparent as the description of the disclosure proceeds.

According to a first embodiment there is provided a Self Organizing Network (SON) element (e.g. a computing platform) operative to communicate with at least one Long-Term Evolution (LTE) wireless network and at least one transport communication network and wherein the SON element is operative to obtain information that relates to dynamically updated Neighbor Lists from a plurality of enodeBs (eNBs) belonging to the at least one LTE wireless network, and to convey information that relates to the dynamically updated Neighbor Lists obtained to at least one managing entity belonging to the transport communication network.

According to another embodiment, the information that relates to the dynamically updated Neighbor Lists is obtained from at least one managing entity belonging to an eNBs Operations Support System (OSS).

In accordance with another embodiment, the information that relates to the dynamically updated Neighbor Lists is conveyed to at least one routing element that belongs to the transport communication network.

By yet another embodiment, the at least one routing element is a Cell Site Gateway ("CSG"). According to still another embodiment the Self Organizing Network (SON) element is adapted to operate with an Multiprotocol Label Switching (MPLS) Virtual Private Network (VPN) transport system connecting the LTE access network components.

In accordance with another aspect, there is provided a method for enabling updates of routing information at routing elements belonging to a transport communication network, the updates result from dynamic changes occurring in neighboring relationships of at least one enodeBs (eNBs) belonging to at least one LTE wireless network and one or more of its neighbors, the method comprises:

providing a SON element operative to communicate with the at least one LTE wireless network and with the transport communication network; receiving at the SON element information that relates to: a) dynamically updated Neighbor Lists from the at least one eNB, and b) at least one routing element associated with the at least one eNB; and conveying by the SON element to the at least one routing element information that relates to the dynamically updated Neighbor Lists of the at least one eNB.

According to another embodiment of this aspect, the method further comprises the steps of: at least one eNB, receiving results of measurements carried out by at least one user equipment ("UE") associated with the at least one eNB (e.g. serviced by that eNB) and updating at the least one eNB, its Neighbor list (NL) according to the information thus received; and providing information to the SON element about changes occurred in the at least one eNB, by a management entity belonging to the at least one LTE wireless network.

By yet another embodiment, the method further comprises a step of creating an MPLS virtual private network (VPN) that comprises a plurality of eNBs and is based upon current neighboring relationships between the plurality of eNBs. According to still another embodiment the method provided further comprises a step of dynamically adding and/or removing at least one eNB to/from the group of the plurality of eNBs comprised in the MPLS VPN, wherein the addition and/or removal is based upon NL related information received from the SON element.

According to another embodiment, the method further comprises a step of establishing clusters, each containing a number of eNBs, without having information at the time when the VPN has been established, as to which of the plurality of eNBs comprised in the MPLS VPN would be grouped together in a cluster.

In accordance with another embodiment, there is provided a computer program product encoding a computer program stored on a non-transitory computer readable storage medium for executing a set of instructions by a computer system comprising one or more computer processors for carrying out the method of the present disclosure.

Implementation of the device and method of the present disclosure involves performing or completing selected tasks or steps manually, automatically, or a combination thereof. Moreover, according to actual instrumentation and equipment of preferred embodiments of the method and system implementing the present disclosure, several selected steps could be implemented by hardware or by software on any operating system of any firmware or a combination thereof. For example, as hardware, selected steps of the disclosure could be implemented by software embedded on chip or an ASIC and be part of that hardware.

As software, selected steps of the disclosure could be implemented as a plurality of software instructions being executed by a computer using any suitable operating system. In any case, selected steps of the method and system of the disclosure could be described as being performed by a data processor, such as a computing platform for executing a plurality of instructions.

EXAMPLE EMBODIMENTS

For purposes of illustrating the techniques of the present disclosure, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In this disclosure, the term "comprising" is intended to have an open-ended meaning so that when a first element is stated as comprising a second element, the first element may also include one or more other elements that are not necessarily identified or described herein, or recited in the claims. In the following description, for the purposes of explanation, certain embodiments and numerous specific details are set forth in order to provide a thorough understanding of the present disclosure. It should be apparent, however, that the disclosure is not limited in its application to the details of construction and the arrangement of the components set forth in the following description or illustrated in the drawings and that the present disclosure may be practiced without these specific details.

The disclosure relates to an embodiment in a Long-Term Evolution (LTE) network, in which the radio access network is an evolved UMTS Terrestrial Radio Access Network (EUTRAN), consisting only of eNodeBs ("eNBs") on the network side. The eNB performs in UTRAN tasks that are similar to those performed by the nodeBs and by the Radio Network Controller (RNC) together in a $3^{rd}$ Generation cellular communications network. The aim of this simplification is to reduce the latency of all radio interface operations. As shown in FIG. 1, the eNBs 102 are connected to other eNBs via X2 interfaces, and they connect to the packet switched core network (the LTE Evolved Packet Core (EPC) network) via respective S1 interfaces. An example of the E-UTRAN architecture is illustrated in FIG. 1. As may be seen from this Figure, the transport architecture includes S1 and X2 interfaces. Obviously, the number of S1 interfaces is related to the number of the eNBs, as each eNB has at least one S1 connection to a node 104 of the LTE Evolved Packet Core ("EPC"), such as a Mobility Management Entity (MME) or a Serving Gateway (SGW). The number of X2 interfaces, on the other hand, increases with the number of neighbor relations that are established per each eNB, since each eNB should be connected to all (or at least several) of its neighboring eNBs.

Figure 2:
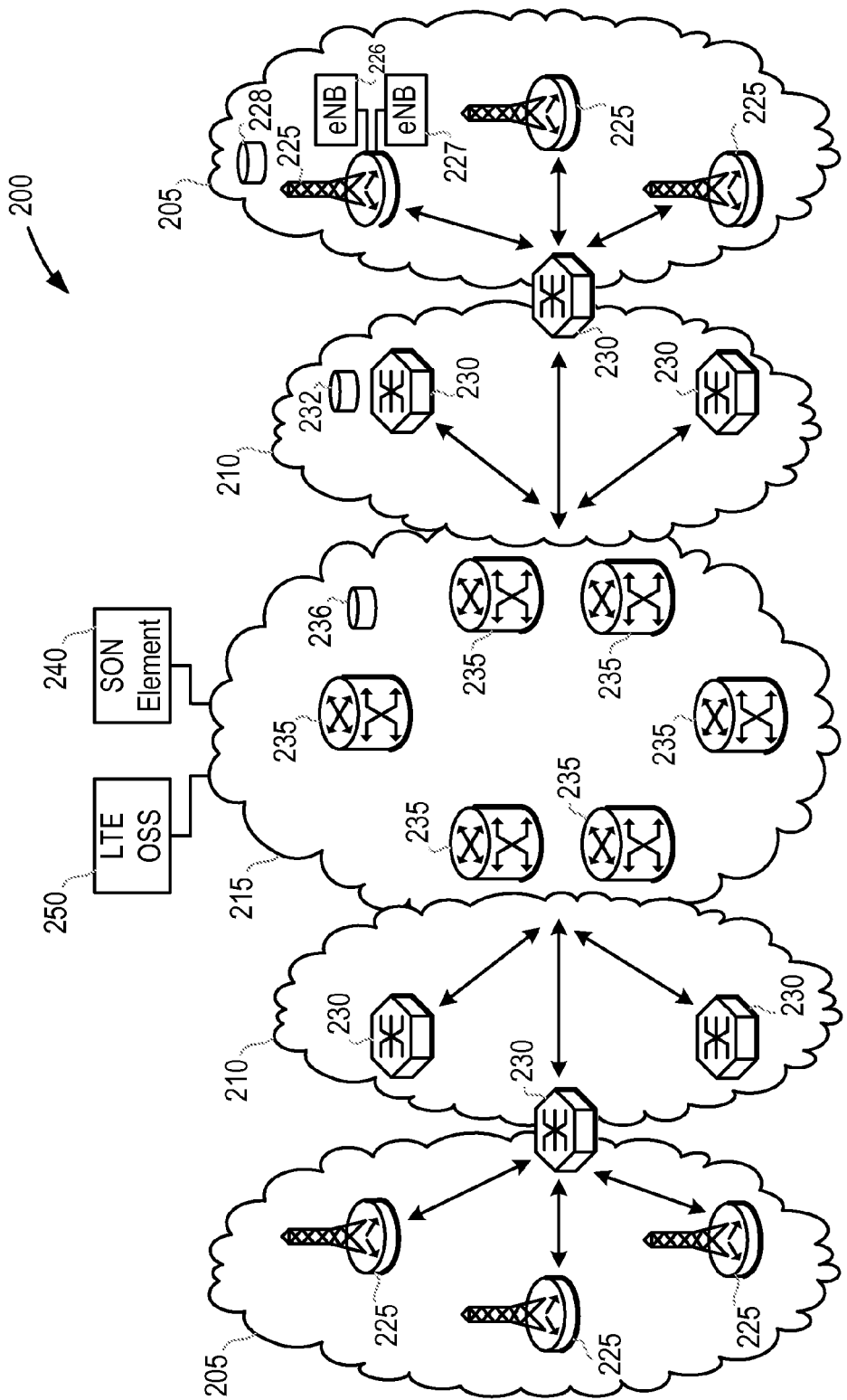
FIG. 2 illustrates an example architecture of a transport network in the LTE network.

FIG. 2 is a schematic block diagram of a cellular telecommunications network 200. The network 200 comprises sub-networks, including nodes such as routers, switches, computers, network devices, etc. In this illustrative example, the network 200 includes an infrastructure of sub-networks or domains organized into an access network 205, an aggregation network 210, and a core network 215, and there are border routers between the access network 205 an the aggregation network 210, and between the aggregation network 210 and the core network 215, using a border gateway protocol (BGP). The access network 205 contains multiple access nodes 225, the aggregation network 210 contains multiple aggregation nodes 230, and the core network 215 contains multiple core nodes 235.

Nodes such as the Mobility Management Entity (MME) or the Serving Gateway (SGW), shown in FIG. 1, are core nodes 235 as shown in FIG. 2.

FIG. 2 also shows a Self-Organizing Network (SON) element 240, and an Operations Support System (OSS) 250 of the LTE network.

In this example, the access nodes 225 include Cell Site Gateways (CSGs). One or more eNodeBs may be connected to each Cell Site Gateway. As an example, FIG. 2 shows two eNodeBs 226, 227 connected to one Cell Site Gateway 22. Multiple Cell Site Gateways may be connected to each aggregation node 230. The aggregation nodes are connected to the core network nodes 235 such as the Mobility Management Entity or Serving Gateway in the Evolved Packet Core. One issue with this solution is the problem of having a Multi Vendor LTE network environment, that is, with nodes provided by different vendors.

In this example, Multiprotocol Label Switching (MPLS) is used to define a virtual private network (VPN) for the transport between the eNodeBs and the core network nodes. Thus, the network operates with an MPLS VPN transport system connecting the LTE UTRAN components. The MPLS network may have any suitable topology, such as a star, a ring, a hub-and-spoke, or a hybrid topology. The links may be wireless (for example using microwave frequencies), or over optical fiber, as examples.

In one embodiment described here, the network 200 shown in FIG. 2 is a Unified MPLS network.

Route Reflectors are provided for Interior Border Gateway Protocol (iBGP) peering in the virtual private network.

In this illustrative embodiment, the routing for the Virtual Private Network is managed by programmable route reflectors, specifically one or more programmable route reflector 228 in the access network 205, one or more programmable route reflector 232 in the aggregation network 210, and one or more programmable route reflector 236 in the core network 215. In this illustrative embodiment, the programmable route reflectors 228, 232, 236 are virtual route reflectors, meaning that they are logically located as shown in FIG. 2, but can be physically located at any convenient location.

The following two main obstacles characterize the problem, which needs to be solved:

1. Not only that each X2 interface may be defined between any eNB to any eNB, also, the relations between neighboring eNBs may be dynamically updated at unknown times as part of the process of managing Neighbor Relations, e.g. by an Automatic Neighbor Relation (ANR) managing entity such as a distributed SON (dSON) element; and 2. A transport network should support any combination of X2 topology, even though the relations between eNBs at the data/control planes are not known to the entity managing the transport network.

To overcome these obstacles, the following should be resolved:

a. The transport network should be able to adapt the VPN routing tables in the Cell Site Gateways (CSG) according to variable eNB neighbor topology under real time (or near real time) conditions;

b. The transport network should be able to optimally support the LTE S1 and X2 interfaces without imposing any interdependencies between transport and radio planning or inefficiencies in either network layer; and c. To be able to set up a VPN across a vast number of eNB sites (e.g. at the order of 100,000 sites), while allowing small groups of nodes (e.g. of about 20 nodes) to communicate, without knowing which nodes will be grouped together at the time when the VPN is provisioned.

It is thus required to provide a solution that addresses the above obstacles.

The Self-Organizing Network (SON) is an automation technology designed to make the planning, configuration, management, optimization and healing of mobile radio access networks simpler and faster. SON functionality and behavior has been defined and specified in generally accepted mobile industry recommendations produced by organizations such as 3GPP (3rd Generation Partnership Project) and the NGMN (Next Generation Mobile Networks).

Various technologies are making use of SON features among which are WiFi, femto cells, Long Term Evolution (LTE) as well as older radio access technologies such as Universal Mobile Telecommunications System (UMTS). Newly added base stations should be self-configured in line with a 'plug-and-play' paradigm, while all operational base stations will regularly self-optimize parameters and algorithmic behavior in response to observed network performance and radio conditions.

The present disclosure describes a SON element 240 with a new functionality, namely to enable a SON element to operate as a mediation element between an LTE wireless network and a transport network such as an MPLS network.

RAN cell sites are places of transformation between mobile radio and mobile transport networks. Cost-effective RAN backhaul requires the ability to simultaneously aggregate the transport of traffic from both legacy and new-generation radios for specific and multiple transport options available at the cell site. In order to overcome this problem certain devices were developed to optimize this radio-to-transport transformation and provide scalable interfaces for existing radios and transport networks as well as the new generation of 4G radios, microwave, and IP RAN transport networks. However, this problem becomes much more complex when the need arises to operate in a Multi Vendor LTE network environment. When operating in such an environment several problems arise. First, the relations between neighboring eNBs may be dynamically updated at unknown times as part of the process of managing Neighbor Relations, e.g. by Automatic Neighbor Relation (ANR) managing entity such as a distributed SON (dSON). Consequently, X2 interfaces defined between each pairs of neighboring eNBs should follow that dynamic update, and the transport network in turn should support any combination of X2 topology, even though the dynamically updated relations between eNBs at the data/control planes are not known to the entity managing the transport network.

Figure 3:
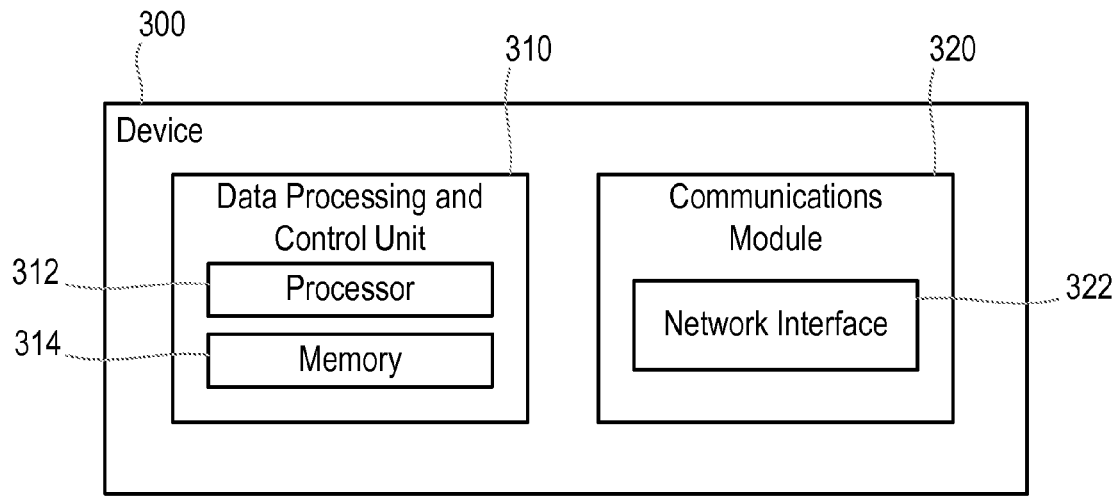
FIG. 3 illustrates an example of an embodiment in accordance with the present disclosure.

FIG. 3 illustrates in general terms the form of the SON element 240. It should be noted that other network nodes can be described with the same general structure.

Specifically, the device 300, of which the SON element 240 is an example, includes a data processing and control module 310 and a communications module 320. The data processing and control module 310 includes at least one processor 312 and at least one memory 314. One function of the memory 314 is to store instructions in the form of a computer program, for causing the processor 312 to perform functions as described herein.

The communications module 320 manages communications between the device 300 and other devices, and includes for example a network interface 322, for connecting the device to the relevant network. For example, in the case of the SON element 240, the network interface 322 manages Internet Protocol (IP) connectivity to other network nodes.

Figure 4:
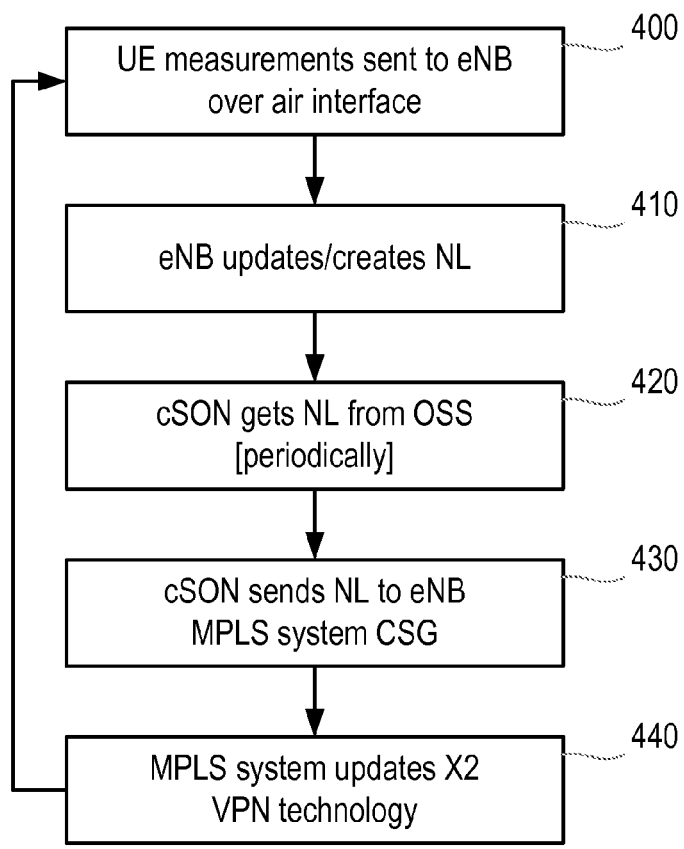
FIG. 4 demonstrates an example of a method for carrying out an embodiment of the present disclosure.

FIG. 4 is a flow chart, illustrating an example of a method of carrying out an embodiment according to the present disclosure, in connection with enabling the operation of the neighbor list of the eNodeB 226 shown in FIG. 2.

At the start of the method, the initial installation of the eNodeB 226 has taken place. Thus, the eNodeB 226 has established a connection with the Evolved Packet Core core network of the cellular communications network, and the eNodeB is able to establish connections with user equipment devices (UEs). At this point, the initial provisioning of the Virtual Private Network has taken place. Thus, the S1 Route Targets have been provisioned, so that the eNodeB 226 is able to communicate through the associated Cell Site Gateway 225 with the SON element 240 and/or the Operations Support System (OSS) 250 of the LTE network.

In step 400, according to this example, signal strength measurements are made by the user equipment devices connected to the eNodeB, and are sent to the eNB via the air interface.

Then, in step 410, the eNB creates (or updates) its own neighbor list (NL) according to the information received. The eNB has an Automatic Neighbor Relation (ANR) function for this purpose. In general terms, as is known, the eNB may include in its neighbor list the other eNBs that can be detected by the UEs that report to it.

The eNB may for example notify the Mobility Management Entity (MME) of the LTE network of its neighbor list, for the purposes of managing handovers. In any event, the Operations Support System (OSS) 250 becomes aware of the neighbor list of the eNB 226.

In step 420, the OSS informs the SON element 240 of the neighbor list of the eNB 226. More generally, the OSS 250 informs the SON element 240 over the relevant 3GPP interface of any newly created neighbor lists and of any updates occurring in any of the eNBs. Thus, the OSS 250 may inform the SON element 240 of the IP address of each eNodeB appearing on a respective neighbor list. The OSS may also inform the SON element 240 of the routing entity (for example the respective Cell Site Gateway) which is associated with the eNB The information may be passed from the OSS 250 to the SON element 240 on a periodical basis or, alternatively, as soon as the information is received at the OSS.

It should also be noted that, in some embodiments, the SON element 240 is able to create or modify neighbor lists of eNodeBs. For example, the SON element 240 may be aware of additional information that means that an eNB that appears in measurement reports is not a suitable handover target and therefore should not appear in a neighbor list and/or may be aware of another eNB that does not appear in any measurement reports currently received by an eNB but that is a suitable handover target and therefore should appear in a neighbor list.

In step 430 of the method shown in FIG. 4, the SON element 240 sends the eNB's NL (or the updates thereof) to the MPLS transport system. Based on that information, in step 440, the MPLS system is now able to update the X2 VPN topology to reflect any changes that have occurred in the eNBs of the LTE network, so that the various routing entities (e.g. the CSGs) have the proper updated information regarding the eNBs that are associated therewith and their neighbor relationships.

There are a number of ways to convey the information from the CSON to the CSGs, all of which should be considered as being encompassed by the present disclosure. For example, each CSG will receive information only regarding their associated eNBs where an update in their NL has occurred. The information regarding such an eNB may comprise its full updated NL or only the change that has occurred in its NL with respect to the currently known information at the CSG for that eNB. The information may be delivered from the CSON to a managing entity that belongs to the transport network and then distributed to the relevant CSGs, or directly from the CSON to the relevant CSGs. The information may be transmitted by the CSON in response to receiving an update on a change in a neighboring list, or be transmitted every pre-defined period of time.

In certain embodiments, a default gateway associated with the eNB has a role in transferring the information from the CSON to the CSGs. For example, the default gateway associated with the eNB may be used to identify directly the Cell Site Gateway (or Access Provider Edge router) to which the SON element has to relay the neighbor list. In this case, various interface options and mechanisms exist that can be used to distribute the required information, such as Telnet or Secure Shell (SSH) with a programmable logic in the Cell Site Gateway; a Software Defined Network protocol such as the Network Configuration Protocol (NETCONF) using the Yang language, or SOAP or REST or the proprietary One Platform Kit (onePK)™ toolkit from Cisco, where the SON element 240 or a managing entity (for example in the form of a software defined network route reflector hierarchy) concludes the VPN routing table (RT) changes that are required.

In another example, programmable route reflectors are used. In this case, the eNB exports to the SON element information about its associated default gateway, and the SON element informs the route reflectors of this, together with the eNB ID and its NL. The relevant route reflector constructs the routing table and marks the VPN routes required by the neighbour list. The CSG then imports the routing table from its associated default gateway.

Thus, in both of the above examples, the default gateway associated with the eNB is used to correlate the updated neighbor list with the Provider Edge router, or CSG, to which it must be provided.

Thus, in the embodiment illustrated in FIG. 2, the SON element 240, which is a centralized SON element in this embodiment, receives, for each eNodeB, the IP addresses of the other eNodeBs appearing in that eNodeB's neighbor list and the information about that eNodeB's default gateway (that is, the Cell Site Gateway through which it is connected to the network). If there have been any changes in the neighbour list, the SON element 240 updates the programmable virtual route reflector 236 in the core network 215. These steps are repeated periodically, or when there is any change in any neighbor list.

The programmable virtual route reflector 236 in the core network 215 receives information from the SON element 240, relating to changes in the neighbor list. These changes in the neighbour list are translated into appropriate route targets, in order to establish the required X2 routing topology in the VPN, so that each eNodeB has the intended X2 connection to the other eNodeBs that appear in its neighbor list.

That is, the programmable virtual route reflector 236 in the core network 215 computes and updates the routes that have to be reflected towards a Cell Site Gateway, based on any changes to the neighbour list of an eNodeB associated with that CSG. It is able to mark the routes with the correct CSG of any eNodeB newly added to the neighbour list, because it has received that information from the SON element 240. The programmable virtual route reflector 236 in the core network 215 is a Route Reflector for both VPN and 3107 BGP, and so it is also able to update the Outbound route filter for the 3107 next hops towards the relevant CSG.

This updating is therefore passed to the programmable virtual route reflector 232 in the aggregation network 210. In this illustrative embodiment, the programmable virtual route reflector 232 in the aggregation network 210 knows where the required routes originate, and also knows from the VPN routing what communication is required between different access networks, and hence it can define the required outbound route filters. This allows a more granular BGP RFC-3107 route planning to be achieved.

The programmable virtual route reflector 228 in the access network 205 can cover the VPN to 3107 ORF correlation for each CSG. By using Route Target constraints, the virtual RR 228 updates the 3107 Outbound Route Filters based on the next hops towards the relevant CSG in the VPN.

Thus, the CSG 228 imports the VPN routing table for each eNodeB that is connected to it. (When there is more than one eNodeB connected to the CSG, the eNodeBs will have different neighbour lists and will therefore require different routing tables.) The routing table is defined algorithmically from the IP interface of the CSG to the eNodeB. The routing table defines the VPN routes that match the Neighbor List. The algorithms used for the routing tables in the CSG are the same as those in the route reflectors 228, 232, 236.

Thus, once the centralised SON system determines the required Neighbor List, this is translated into a set of associated VPN Route Targets for the Virtual Routing and Forwarding in the relevant CSG. The eNB X2 IP addresses are mapped algorithmically into VPN Route Targets. Then, a Border Gateway Protocol Routing Table Constrained procedure takes place to populate the VPN routing table accordingly. If these VPN routes include Unified MPLS next hops that are not currently available, then the RFC-3107 Border Gateway Protocol has to be updated.

There is therefore disclosed a transport network that is able to adapt under real time (or near real time) conditions the dynamically updated routing tables in the Cell Site Gateways (CSG) according to variable eNB neighbor topology.

Furthermore, by adopting the solution provided by the present disclosure, the transport network is able to optimally support the LTE S1 and X2 interfaces without imposing any interdependencies between transport and radio planning or any other inefficiencies in either one of the network layers.

Also, the solution provided by the present disclosure enables the operator to set up a VPN across a vast number of eNB sites (e.g. at the order of 100,000 sites), while allowing small groups (clusters) of nodes (e.g. each comprising about 20 nodes) to communicate without knowing which nodes will be grouped together, at the time when the VPN is provisioned.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination. Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for enabling updates of routing information at routing elements belonging to a transport communication network, comprising:
  receiving at a Self-Organizing Network (SON) element information associated with an updated Neighbor List of an eNodeB, wherein the SON element is in communication with a Long Term Evolution (LTE) wireless network and a transport communication network and wherein the transport communication network comprises at least one of an S1 interface and an X2 interface;
  conveying, by the SON element, the information associated with the updated Neighbor List of the eNodeB to a first virtual route reflector in a core network of the transport communication network;
  updating a routing table for a Cell Site Gateway associated with the eNodeB, wherein the updating is performed by the first virtual route reflector for routing changes in the core network that are based on the information associated with the updated Neighbor List of the eNodeB;
  conveying the routing table to a second virtual route reflector in an aggregation network of the transport communication network;
  updating the routing table by the second virtual route reflector for routing changes in the aggregation network that are based on the information associated with the updated Neighbor List of the eNodeB;
  conveying the routing table to a third virtual route reflector in an access network of the transport communication network;
  updating the routing table by the third virtual route reflector for routing changes in the access network that are based on the information associated with the updated Neighbor List of the eNodeB;
  conveying the routing table to a default gateway associated with the Cell Site Gateway; and
  importing, by the Cell Site Gateway, the routing table from the default gateway.

2. The method of claim 1, further comprising:
  receiving results of measurements carried by at least one user equipment (UE) associated with the eNodeB and updating the Neighbor List of the eNodeB according to the results received; and
  providing information to the SON element about changes that have occurred for the eNodeB from a management entity belonging to the LTE wireless network.

3. The method of claim 1, further comprising:
  creating a Multiprotocol Label Switching (MPLS) Virtual Private Network (VPN) that comprises a plurality of eNodeBs and is based upon current neighbor relationships between the plurality of eNodeBs.

4. The method of claim 3, further comprising:
  performing at least one of adding and removing at least one eNodeB to or from said plurality of eNodeBs comprised in the MPLS VPN based on Neighbor List (NL) related information received from the SON element.

5. The method of claim 3, further comprising:
  establishing clusters, each cluster containing a number of eNodeBs, without having information at a time that the VPN is established that identifies which of the plurality of eNodeBs comprised in the MPLS VPN are to be grouped together in a particular cluster.

6. The method of claim 1, wherein the information associated with the updated Neighbor List comprises information for updating the routing table for the Cell Site Gateway to establish a particular X2 interface between the eNodeB and one or more other eNodeBs.

7. Non-transitory tangible media that includes instructions for execution, wherein the execution causes at least one processor to perform operations comprising:
  receiving at a Self-Organizing Network (SON) element information associated with an updated Neighbor List of an enodeB, wherein the SON element is in communication with a Long Term Evolution (LTE) wireless network and a transport communication network and wherein the transport communication network comprises at least one of an S1 interface and an X2 interface;
  conveying, by the SON element, the information associated with the updated Neighbor List of the eNodeB to a first virtual route reflector in a core network of the transport communication network;
  updating a routing table for a Cell Site Gateway associated with the eNodeB, wherein the updating is performed by the first virtual route reflector for routing changes in the core network that are based on the information associated with the updated Neighbor List of the eNodeB;
  conveying the routing table to a second virtual route reflector in an aggregation network of the transport communication network;
  updating the routing table by the second virtual route reflector for routing changes in the aggregation network that are based on the information associated with the updated Neighbor List of the eNodeB;
  conveying the routing table to a third virtual route reflector in an access network of the transport communication network;
  updating the routing table by the third virtual route reflector for routing changes in the access network that are based on the information associated with the updated Neighbor List of the eNodeB;
  conveying the routing table to a default gateway associated with the Cell Site Gateway; and
  importing, by the Cell Site Gateway, the routing table from the default gateway.

8. The media of claim 7, the operations further comprising:
receiving results of measurements carried by at least one user equipment (UE) associated with the eNodeB and updating the Neighbor List (NL) of the eNodeB according to the results received; and
providing information to the SON element about changes occurred in the eNodeB by a management entity belonging to the LTE wireless network.

9. The media of claim 7, the operations further comprising:
creating a Multiprotocol Label Switching (MPLS) Virtual Private Network (VPN) that comprises a plurality of eNodeBs and is based upon current neighbor relationships between the plurality of eNodeBs.

10. The media of claim 9, the operations further comprising:
performing at least one of adding and removing at least one eNodeB to or from said plurality of eNodeBs comprised in the MPLS VPN based on Neighbor List (NL) related information received from the SON element.

11. The media of claim 9, the operations further comprising:
establishing clusters, each cluster containing a number of eNodeBs, without having information at a time that the VPN is established that identifies which of the plurality of eNodeBs comprised in the MPLS VPN are to be grouped together in a particular cluster.

12. The media of claim 7, wherein the information associated with the updated Neighbor List comprises information for updating the routing table for the Cell Site Gateway to establish a particular X2 interface between the eNodeB and one or more other eNodeBs.

13. A system comprising:
at least one memory element for storing data; and
at least one processor for executing instructions associated with the data, wherein the executing causes the system to perform operations comprising:
receiving at a Self-Organizing Network (SON) element information associated with an updated Neighbor List of an enodeB, wherein the SON element is in communication with a Long Term Evolution (LTE) wireless network and a transport communication network and wherein the transport communication network comprises at least one of an S1 interface and an X2 interface;
conveying, by the SON element, information associated with the updated Neighbor List of the eNodeB to a first virtual route reflector in a core network of the transport communication network;
updating a routing table for a Cell Site Gateway associated with the eNodeB, wherein the updating is performed by the first virtual route reflector for routing changes in the core network that are based on the information associated with the updated Neighbor List of the eNodeB;
conveying the routing table to a second virtual route reflector in an aggregation network of the transport communication network;
updating the routing table by the second virtual route reflector for routing changes in the aggregation network that are based on the information associated with the updated Neighbor List of the eNodeB;
conveying the routing table to a third virtual route reflector in an access network of the transport communication network;
updating the routing table by the third virtual route reflector for routing changes in the access network that are based on the information associated with the updated Neighbor List of the eNodeB;
conveying the routing table to a default gateway associated with the Cell Site Gateway; and
importing, by the Cell Site Gateway, the routing table from the default gateway.

14. The system of claim 13, wherein the executing causes the system to perform further operations comprising:
receiving results of measurements carried by at least one user equipment (UE) associated with the eNodeB and updating the Neighbor List of the eNodeB according to the results received; and
providing information to the SON element about changes that have occurred for the eNodeB from a management entity belonging to the LTE wireless network.

15. The system of claim 13, wherein the executing causes the system to perform further operations comprising:
creating a Multiprotocol Label Switching (MPLS) Virtual Private Network (VPN) that comprises a plurality of eNodeBs and is based upon current neighbor relationships between the plurality of eNodeBs.

16. The system of claim 15, wherein the executing causes the system to perform further operations comprising:
performing at least one of adding and removing at least one eNodeB to or from said plurality of eNodeBs comprised in the MPLS VPN based on Neighbor List (NL) related information received from the SON element.

17. The system of claim 15, wherein the executing causes the system to perform further operations comprising:
establishing clusters, each cluster containing a number of eNodeBs, without having information at a time that the VPN is established that identifies which of the plurality of eNodeBs comprised in the MPLS VPN are to be grouped together in a particular cluster.

18. The system of claim 13, wherein the information associated with the updated Neighbor List comprises information for updating the routing table for the Cell Site Gateway to establish a particular X2 interface between the eNodeB and one or more other eNodeBs.

* * * * *